UNITED STATES PATENT OFFICE.

WILHELM HELMUTH SCHWEITZER, OF HEIDELBERG, GERMANY, ASSIGNOR TO SOCIETY "TECHNOCHEMIA" AKTIENGESELLSCHAFT, OF GLARUS, SWITZERLAND.

TEXTILE PRODUCT DERIVED FROM AN ANIMAL FIBER AND A PROCESS OF MAKING SAME.

1,389,275.     Specification of Letters Patent.     Patented Aug. 30, 1921.

No Drawing.     Application filed April 28, 1921. Serial No. 465,289.

*To all whom it may concern:*

Be it known that I, WILHELM HELMUTH SCHWEITZER, a citizen of the German Republic, and resident of Heidelberg, Germany, have invented a new and useful Textile Product Derived from an Animal Fiber and a Process of Making Same, (for which I have filed an application in Germany, April 20, 1920,) of which the following is a full, complete, and exact specification.

Among the ingredients described and recommended heretofore for the oxidizing treatment of animal fibers, such as wool fiber, gaseous chlorin, bromin water and hypochlorous acid have principally been used.

Hypochlorous acid especially has heretofore only been used in a concentration corresponding to 12 kg. of chlorid of lime for 100 kg. of the fiber in form of an aqueous solution of chlorid of lime of 1.5 per cent.

Bromin dissolved in water has been recommended in the proportion of 5 to 7½ parts of bromin for 100 parts of the fiber.

Chlorin gas has never been recommended in a proportion higher than 25 liters of chlorin gas for 1 kilo of the fiber, viz. 8 kg. of chlorin for 100 kilos of the fiber.

Till now it was believed that the animal fiber undergoes destruction when treated with a higher quantity of hypochlorous acid. But that is not the case.

I have now found that on the contrary in a surprising manner the use of a very great excess of hypochlorous acid, as for instance 100 to 150 kilos of chlorid of lime for 100 kilos of the fiber, or of a notable excess of any other well known oxidizing agents does no harm to the fiber.

When the fiber has been treated with such an excess of hypochlorous acid or other oxidizing agent it is further treated, after rinsing, with a boiling solution of soap.

*Example.*

100 kilos of pig hairs are treated at ordinary temperature for about one hour with 120 kilos of chlorid of lime dissolved in 1000 liters of water to which an equivalent quantity of ordinary hydrochloric acid has been added; the pig hairs are then washed with water and boiled for some time with a solution of 5 kilos of Marseille soap in 2000 liters of water.

Fibers which have been treated in this manner show a great difference with the chlorinated wool known till now. They are much softer, have a greater affinity for coloring matters and are far more lustrous.

What I claim is:

1. The herein described textile product derived from an animal fiber, which results from the treatment of the said animal fiber first with a large excess of an oxidizing agent and afterward with a boiling solution of soap and which shows an increased softness, an increased affinity for dyestuffs and a greater luster.

2. The herein described process for the manufacture of a textile product derived from an animal fiber, by treating the said animal fiber with a great excess of an oxidizing agent, rinsing the thus treated fiber and subjecting the rinsed fiber to a boiling with a solution of soap.

In witness whereof I have hereunto signed my name this 30th day of March, 1921, in the presence of two subscribing witnesses.

WILHELM HELMUTH SCHWEITZER.

Witnesses:
EMILE BRONNERT,
ADMAND GRAM.